(12) United States Patent
Bellerose et al.

(10) Patent No.: US 9,417,624 B2
(45) Date of Patent: Aug. 16, 2016

(54) METHOD OF MAKING A PART AND RELATED SYSTEM

(71) Applicant: Pratt & Whitney Canada Corp., Longueuil (CA)

(72) Inventors: Michel Bellerose, Ste-Julie (CA); Mario Blais, Varennes (CA); Visal Ing, Ste-Julie (CA); Alain Bouthillier, Ste-Julie (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 143 days.

(21) Appl. No.: 14/053,941

(22) Filed: Oct. 15, 2013

(65) Prior Publication Data

US 2014/0046478 A1 Feb. 13, 2014

Related U.S. Application Data

(62) Division of application No. 11/735,691, filed on Apr. 16, 2007, now Pat. No. 8,578,581.

(51) Int. Cl.
*G05B 19/4097* (2006.01)
*G05B 19/402* (2006.01)
*G05B 19/404* (2006.01)

(52) U.S. Cl.
CPC .......... *G05B 19/4097* (2013.01); *G05B 19/402* (2013.01); *G05B 19/404* (2013.01); *G05B 2219/36063* (2013.01); *G05B 2219/37205* (2013.01); *Y10T 29/49* (2015.01); *Y10T 29/49778* (2015.01); *Y10T 29/49995* (2015.01);
(Continued)

(58) Field of Classification Search
CPC ............. G05B 19/4097; G05B 19/402; G05B 19/404; G05B 2219/36063; G05B 2219/37205; B23Q 17/003; B23Q 17/099; B23Q 17/20; Y10T 29/496; Y10T 29/49778; Y10T 29/49995; Y10T 29/49996; Y10T 29/49758
USPC ............... 219/121.7, 121.71, 121.81, 121.82, 219/121.83; 408/1 R, 10; 700/98, 163, 182
See application file for complete search history.

(56) References Cited

U.S. PATENT DOCUMENTS

| | | | |
|---|---|---|---|
| 5,117,087 | A | 5/1992 | Baker et al. |
| 5,898,590 | A | 4/1999 | Wampler |

(Continued)

FOREIGN PATENT DOCUMENTS

| | | |
|---|---|---|
| GB | 2342187 | 4/2000 |
| WO | 2006024844 | 3/2006 |

OTHER PUBLICATIONS

Brochure—"PolyWorks—Total Point Cloud Inspection and Reverse-Engineering Software Solution"—InnovMetric Software Inc.

(Continued)

*Primary Examiner* — Christopher Besler
(74) *Attorney, Agent, or Firm* — Norton Rose Fulbright Canada LLP (57) ABSTRACT

A system and method of making a part, including capturing an actual tridimensional surface of each part to obtain a corresponding digitized actual surface, performing a tridimensional comparison between the digitized actual surface of each part and a nominal tridimensional surface, generating an actual location and orientation of an operation to be performed based on the tridimensional comparison, and performing the operation on the part based on the generated actual location and orientation of the element.

11 Claims, 7 Drawing Sheets

(52) U.S. Cl.
CPC .......... *Y10T 29/49996* (2015.01); *Y10T 408/03* (2015.01)

(56) References Cited

U.S. PATENT DOCUMENTS

| | | |
|---|---|---|
| 5,903,459 A | 5/1999 | Greenwood |
| 6,256,546 B1 | 7/2001 | Graham et al. |
| 6,483,596 B1 | 11/2002 | Philippi et al. |
| 6,720,519 B2 | 4/2004 | Liu et al. |
| 6,859,988 B2 | 3/2005 | Lovchik et al. |
| 2004/0083024 A1 | 4/2004 | Wang |
| 2005/0115375 A1 | 6/2005 | Dick et al. |
| 2005/0284937 A1 | 12/2005 | Xi |
| 2006/0181236 A1 | 8/2006 | Brogardh |
| 2007/0051707 A1 | 3/2007 | Elfizy |

OTHER PUBLICATIONS

Brochure—"Online 3D Gauging—Flexible Online 3D Gauging Solution"—Orus Integration Inc.
Brochure—3D Series—Three-Dimensional (X, Y, Z) Inspection System—Orus Integration Inc.

METHOD OF MAKING A PART AND RELATED SYSTEM

RELATED APPLICATIONS

This application is a divisional of U.S. Pat. No. 8,578,581 filed on Apr. 16, 2007, and issued on Nov. 12, 2013, the content of which is hereby incorporated by reference.

TECHNICAL FIELD

The invention relates generally to a method and system for compensating for differences between a nominal definition of a part and an actual part during a manufacturing process applied to the part.

BACKGROUND OF THE ART

When laser drilling holes or in other manufacturing processes, the machining tool must be positioned accurately with respect to the part being manufactured if the final part is to be made with any precision. In laser drilling, for example, the laser nozzle may be positioned in a nominal drilling location relative to a nominal surface of the part, the nominal drilling location being determined solely using a nominal computer model of the part, provided for example by a CAD (computer aided design) file. However, such an approach does not provide feedback as to whether the actual part is in the desired nominal location or has the desired nominal surface. Because of the differences between the actual surface and the nominal computer model of that surface, the holes may inadvertently be drilled at different locations and/or angles than those desired and defined in the nominal model, and as such may also have a diameter different from the nominal diameter. Thus, the final part may not be as desired. In the case of gas turbine parts in which cooling holes are drilled, the airflow rate and its direction through the cooling holes for the actual part may be different than for the nominal part, which can reduce the cooling effectiveness and as such the life of the actual part.

Figures 1A, 1B:
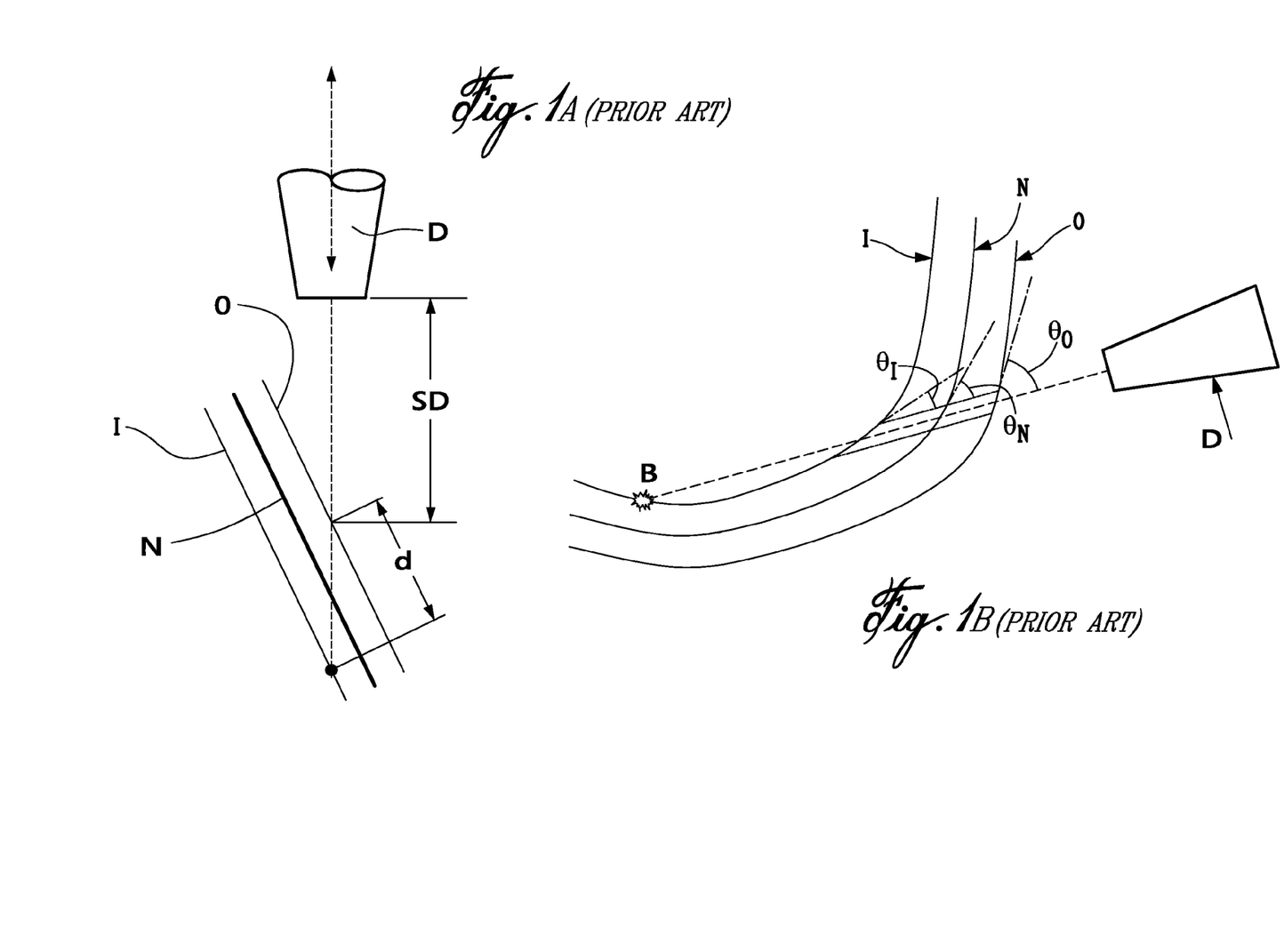
FIG. 1A is a schematic view of a drilling process for a flat surface.
FIG. 1B is a schematic view of the drilling process of FIG. 1A applied to a curved surface.

FIG. 1A shows an example where a nominal straight profile as defined by the nominal computer model is indicated at N, and actual straight profiles located respectively inwardly and outwardly of the nominal profile N are indicated at I and O. A laser nozzle D is moved along its axis such as to keep a given distance SD with the actual surface of the part, and the nozzle D is aligned with the hole location of the nominal profile N. It can be seen that the hole locations in the actual profiles I, O, are different from one another and from the hole location set forth in the nominal profile N. As such, an undesirable variation d is introduced in the location of the hole depending on the actual profile of the part.

FIG. 1B shows another example where actual, arcuate profiles I and O are located respectively inwardly and outwardly of an arcuate nominal profile N. In this case, as the nozzle D is aligned with the hole location of the nominal profile N, the variation between the nominal profile N and the actual profiles I and O not only introduces a variation in the location of the hole, but also a variation between the hole angle $\theta_N$ defined in the nominal profile and the hole angles $\theta_I$ and $\theta_O$ produced in the actual profiles I and O, with $\theta_I < \theta_N < \theta_O$. In addition, the drilling operation can also produce a back strike B when drilling the hole, thus damaging the interior surface of the part.

Similar variations between machined elements in an actual part and those same elements in a nominal part can also be observed in a variety of machining or other manufacturing operations.

Accordingly, there is a need to provide improved compensation for the differences between the nominal definition of a part and the actual part.

SUMMARY

It is therefore an aim to address the above-mentioned concerns.

In one aspect, there is provided a method of making a part, the method comprising providing a nominal tridimensional part definition including a nominal part surface, and a nominal location and orientation for at least one geometrical element on the nominal part surface, capturing an actual tridimensional surface of the part to obtain a corresponding digitized actual surface, performing a tridimensional comparison between the digitized actual surface and the nominal part surface, generating an actual location and orientation of each geometrical element on the digitized actual surface based on the tridimensional comparison, and providing each geometrical element on the actual surface based on the actual location and orientation of the element on the digitized actual surface.

In another aspect, there is provided a method of drilling a plurality of holes in a part, the method comprising providing a model of the part, the model including a nominal surface of the part, a nominal location on the nominal surface of each of the holes to be drilled in the part and a nominal orientation of each of the holes with respect to the nominal surface, obtaining a digitized actual surface representing an actual surface of the part, projecting the nominal location of each of the holes on the digitized actual surface based on a tridimensional comparison between the digitized actual surface and the nominal surface to determine an actual location on the digitized actual surface corresponding to each of the nominal locations on the nominal surface, determining an actual orientation of a drilling tool for each of the holes based on the nominal orientation of the hole with respect to the nominal surface and on the tridimensional comparison between the nominal surface and the digitized actual surface, and drilling each of the holes on the actual surface of the part at the corresponding actual location and following the corresponding actual orientation.

In a further aspect, there is provided a machining system for providing to a machine tool an actual location and orientation of a plurality of elements to be machined on a part, the system comprising a scanner for capturing an actual tridimensional surface of the part and defining a digitized actual surface representing the actual tridimensional surface, a comparator for performing a tridimensional comparison between the digitized actual surface and a nominal tridimensional surface of the part to determine a best fit between the digitized actual surface and the nominal surface, and a compensation calculator for generating the actual location and orientation of each of the elements on the actual digitized surface based on a nominal location and orientation for each of the elements on the nominal surface and on the best fit between the digitized actual surface and the nominal surface.

Further details of these and other aspects will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 2:
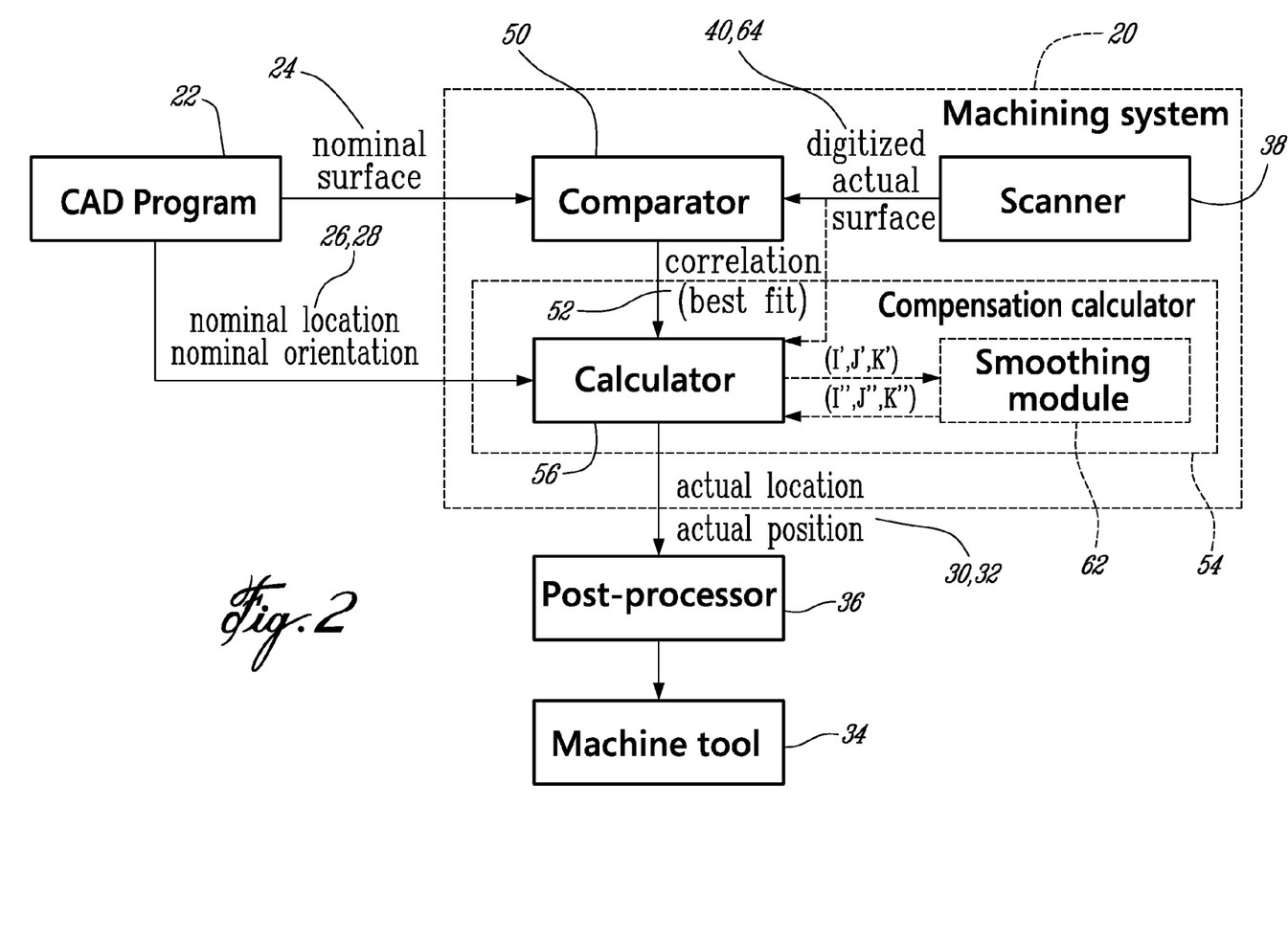
FIG. 2 is a block diagram of a machining system shown in interaction with other elements used in a machining operation.

FIG. 2 illustrates an example of a machining system 20. The machining system 20 generally receives a nominal tridimensional definition of a part to be machined, for example in the form of a CAD file provided by a CAD program 22. The nominal tridimensional definition corresponds to a model of the entire part or of a tridimensional surface of the part and includes at least a nominal surface 24 of the part, as well as a nominal location 26 and a nominal orientation 28 of each of a plurality of geometrical elements machined on that surface.

In the present specification and claims, the terms "geometrical element" and "element" are intended to encompass all the features that define a part, such as for example a surface, profile, ellipse, diameter, angle, plane, slot, hole, groove, etc., as well as one or many surfaces that can be used as datum. The term "nominal" as applied to a part, surface, geometrical element, etc. is intended to refer to the part, surface, geometrical element, etc. as defined in a theoretical model such as a CAD model, without tolerances, which may be used as a reference when machining one or a plurality of similar actual parts, surfaces, geometrical elements, etc. The term "actual" as applied to a part, surface, geometrical element, etc. is intended to refer to the real, physical part, surface, geometrical element, etc. at various stages of the manufacturing process, including any variation brought by that process. As such, a plurality of actual parts manufactured based on the same nominal part will usually be slightly different from one another and from that nominal part.

The machining system 20 transforms the nominal location 26 and the nominal orientation 28 of each element to be machined into an actual location 30 and an actual orientation 32 adapted to each real, actual part being machined, as will be described below, such that the actual location 30 and the actual orientation 32 of each element is fed to a computerized numerical control (CNC) machine tool 34 for machining that part.

In a particular embodiment, the various elements of the systems 20 communicate and interact without human intervention, and are for example actuated by a voltage signal generated by the CNC machine tool 34 or by an appropriate signal generated by an executable computer file.

In a particular embodiment, the machine tool 34 is a drilling machine such as described in U.S. patent application Ser. No. 11/218,785 filed Sep. 6, 2005, the entire specification of which is incorporated herein by reference. If required, the actual location 30 and the actual orientation 32 can be processed by a post-processor 36 before being sent to the machine tool 34, such as to express them in an appropriate machine coordinate system usable by the machine tool 34.

The machining system 20 will be described herein in relation to a drilling operation, which in a particular embodiment is a drill-on-the-fly (DOF) machining operation to define cooling holes in an annular part, such as for example a combustor liner, a combustor heat shield or a blade or vane ring in a gas turbine engine. However, it is understood that the machining system 20 and related method can be used with other types of parts, such as for example non annular parts such as an airfoil of a gas turbine engine, as well as for other types of drilling operations such as trepanning and laser percussion, and for various alternate machining operations such as for example electrical discharge machining (EDM), lathing, grinding and milling. One example of an alternate application is the machining and milling of integrally bladed rotors in a gas turbine engine, and particularly for correcting, if necessary, the leading edges of the blades.

Still referring to FIG. 2, the machining system 20 includes a scanner 38, which captures an actual tridimensional surface of the part. In a particular embodiment, the scanner 38 is a line laser scanner, for example scanning 2000 points or traces at a time, allowing the capture of 6 million points per second. Alternate scanners 38 that can be used include a photogrammetry apparatus, a point laser scanner, a tomography apparatus, a coordinates measuring machine, etc.

Figure 3:
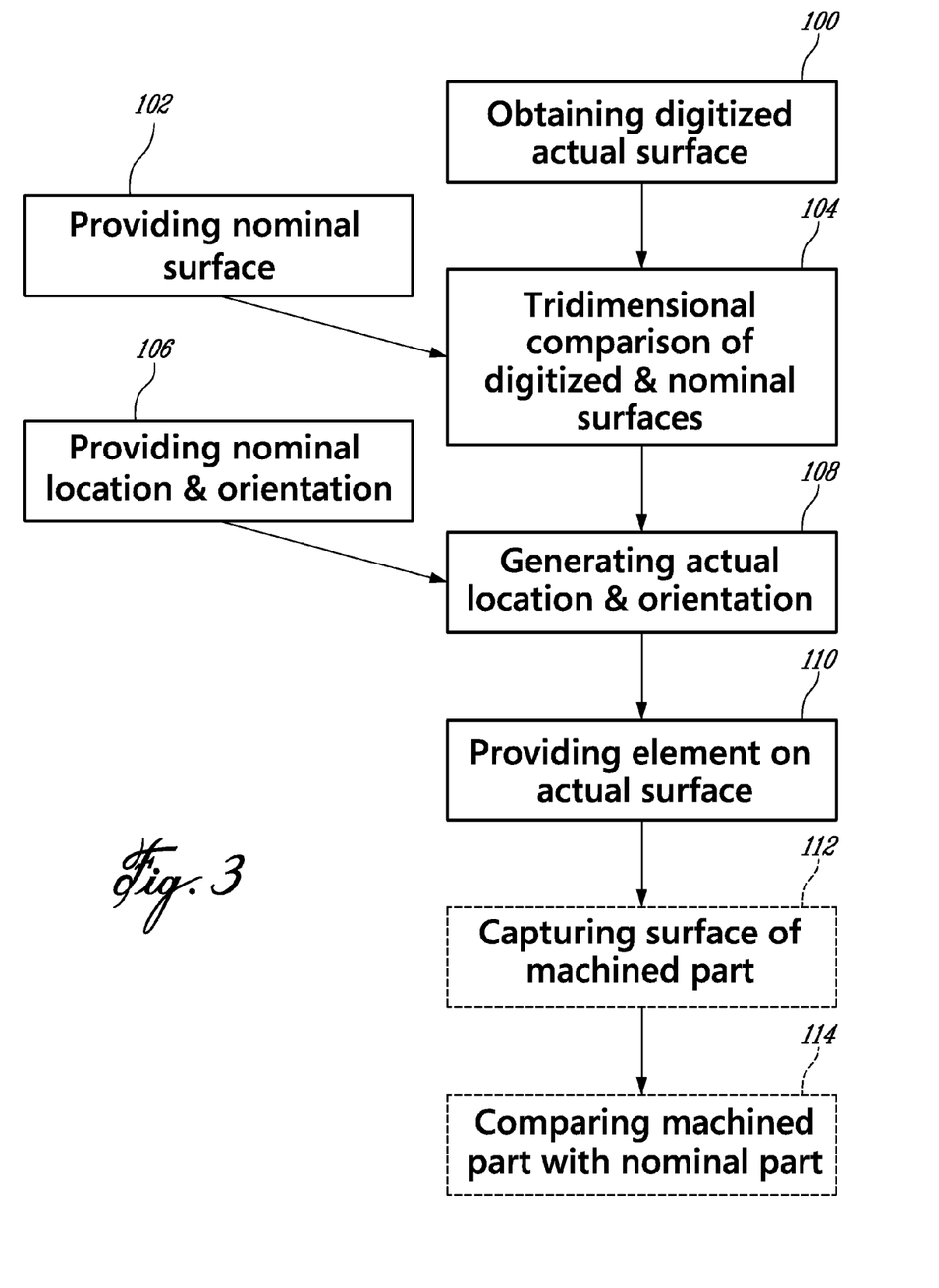
FIG. 3 is a flow chart of a method of making a part, for example using the system of FIG. 2.

The scanner 38 captures the actual tridimensional surface of each part to be machined and obtains a corresponding digitized actual surface 40 representing that actual surface, as illustrated by step 100 of FIG. 3. In a particular embodiment, the digitized actual surface 40 includes a point cloud formed of a plurality of points captured on the actual surface. Alternate digitized actual surfaces 40 that can be used include for example a meshed surface (such as for example a mesh surface generated from a point cloud), nurbs (non-uniform rational b-splines), etc. The digitized actual surface 40 thus approximates the actual surface, with the accuracy of this approximation depending on the resolution of the scanner 38 (for example the distance between captured points, nurbs, etc.). As such, in a particular embodiment, the digitized actual surface 40 includes a point cloud composed of millions of points (e.g. 5 million). The distance between adjacent points is preferably smaller than the size of the smallest geometrical element to be machined (e.g. the diameter of the smallest hole) such as to provide enough precision for adequate location of the machined elements. In a particular embodiment, the machined elements include a series of holes, the smallest of which has a diameter of 0.02 inch, and the distance between adjacent points of the cloud is between 0.0001 and 0.01 inch.

Figure 4:
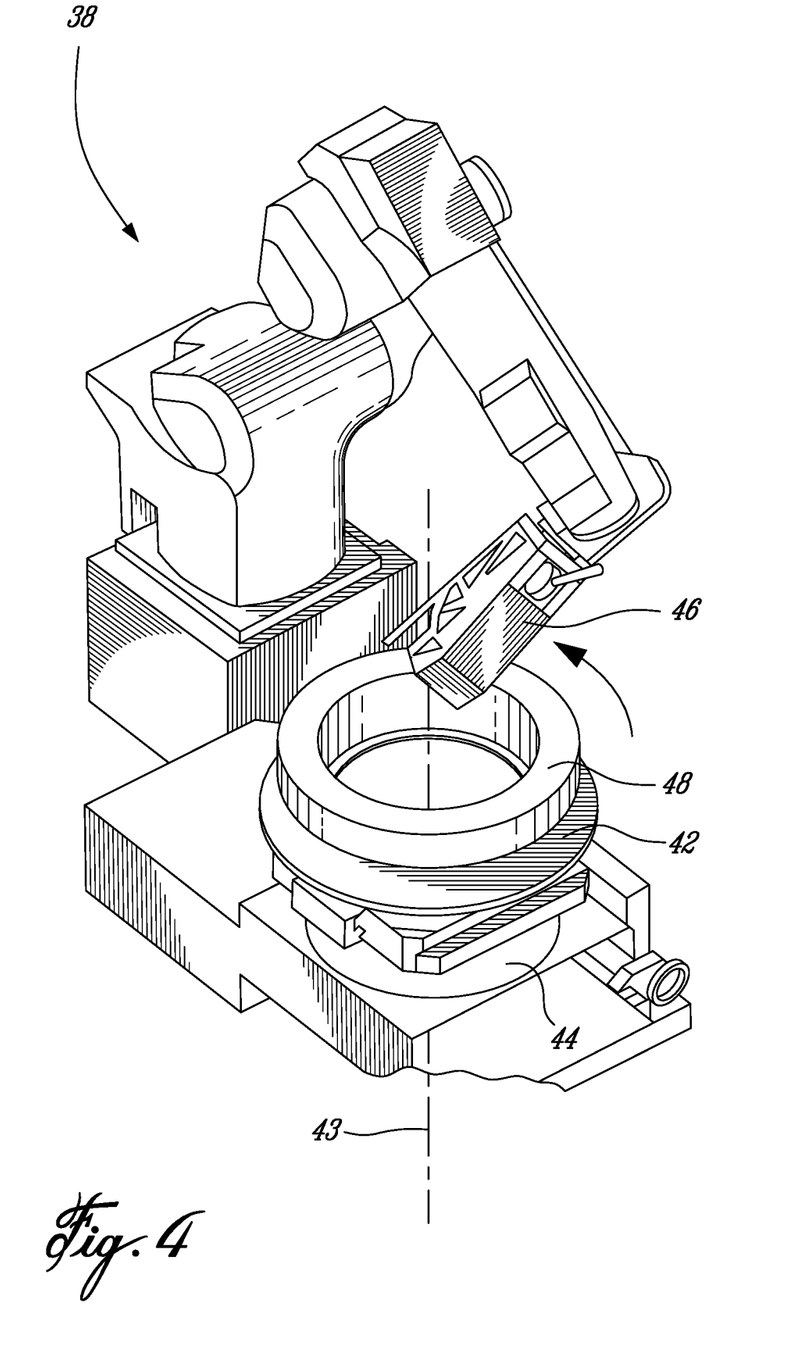
FIG. 4 is a perspective view of a scanner of the system of FIG. 2, shown in combination with a part being scanned in a particular application of the system.

As shown in FIG. 4, the part 48 is received on a fixture 42 in a fixed manner, and the fixture 42 is rotationally received in a known position on a base 44 of the scanner 38. The fixture 42 is rotated about its axis of rotation 43. The scanner 38 includes a scanning head 46 which is positioned over the surface of the part 48 to be scanned, and remains stationary while scanning the actual surface of the part 48 as the part 48 rotates with the fixture 42. In a particular embodiment, the scanning head 46 scans the part 48 as if it was a linear part and produces a point cloud representing a planar, "unfolded" version of the actual surface of the part. The point cloud is then "rolled" around the axis of rotation 43 of the fixture 42 such as to obtain the digitized actual surface 40 representing the tridimensional configuration of the actual surface of the part 48.

Referring back to FIG. 2, the machining system 20 includes a comparator 50, which receives the digitized actual surface 40 from the scanner 38. The comparator 50 also receives the nominal surface 24 provided by the CAD program 22, as illustrated by step 102 in FIG. 3. The comparator 50 performs a tridimensional comparison between the digitized actual surface 40 and the nominal surface 24 to find a correlation or best fit 52 therebetween, as illustrated by step 104 in FIG. 3. In the present specification and claims, "tridimensional comparison" is intended to include both the comparison of the digitized actual surface 40 and the nominal surface 24 with one another as well as the comparison of their relative position in a tridimensional environment, such as to determine corresponding points, meshed portions, nurbs, etc. between the digitized actual surface 40 and the nominal surface 24 and a relative displacement and rotation, where applicable, between these corresponding points, meshed portions, nurbs, etc.

In a particular embodiment, the comparator 50 compares the digitized actual surface 40 which is in the form of a point cloud with the nominal surface 24 using the Polyworks® software produced by InnovMetric Software Inc. Alternate calculating software that can be used by the comparator 50 depends on the form of the digitized actual surface 40 and include any adequate software that can be used to manipulate point clouds, meshed surfaces, nurbs, etc. such as for example Focus software provided by Metris, software provided by Geomagic, Prélude® provided by IBM's MdtVision, etc.

Referring back to FIG. 2, the machining system 20 further includes a compensation calculator 54, which includes a calculator 56 receiving the correlation 52 between the point cloud 40 and the nominal surface 24 from the comparator 50. The calculator 56 also receives the nominal location 26 and the nominal orientation 28 of each machined element provided by the CAD program 22, as illustrated by step 106 (FIG. 3). The calculator 54 then generates the actual location 30 and the actual orientation 32 for each element, as illustrated by step 108 (FIG. 3).

The calculator 54 thus aligns the digitized actual surface 40 and the nominal surface 24 following the best fit 52 found by the comparator 50, and projects the nominal location 26 of each machined element on the digitized actual surface 40 to obtain the corresponding actual location 30 for that element. In a particular embodiment, the calculator 56 receives the nominal location 26 of each machined element as a set of Cartesian coordinates (X, Y, Z), and projects each nominal location 26 perpendicularly to the nominal surface 24 and on the digitized actual surface 40 to obtain the actual location 30 as a new set of Cartesian coordinates (X', Y', Z'). Alternately, several other types of projection can be used, such as for example a radial or axial projection (particularly in the case of an annular part), or a projection parallel to an adjacent reference surface, for example a surface to be cooled by an airflow coming through holes being machined.

Figure 5:
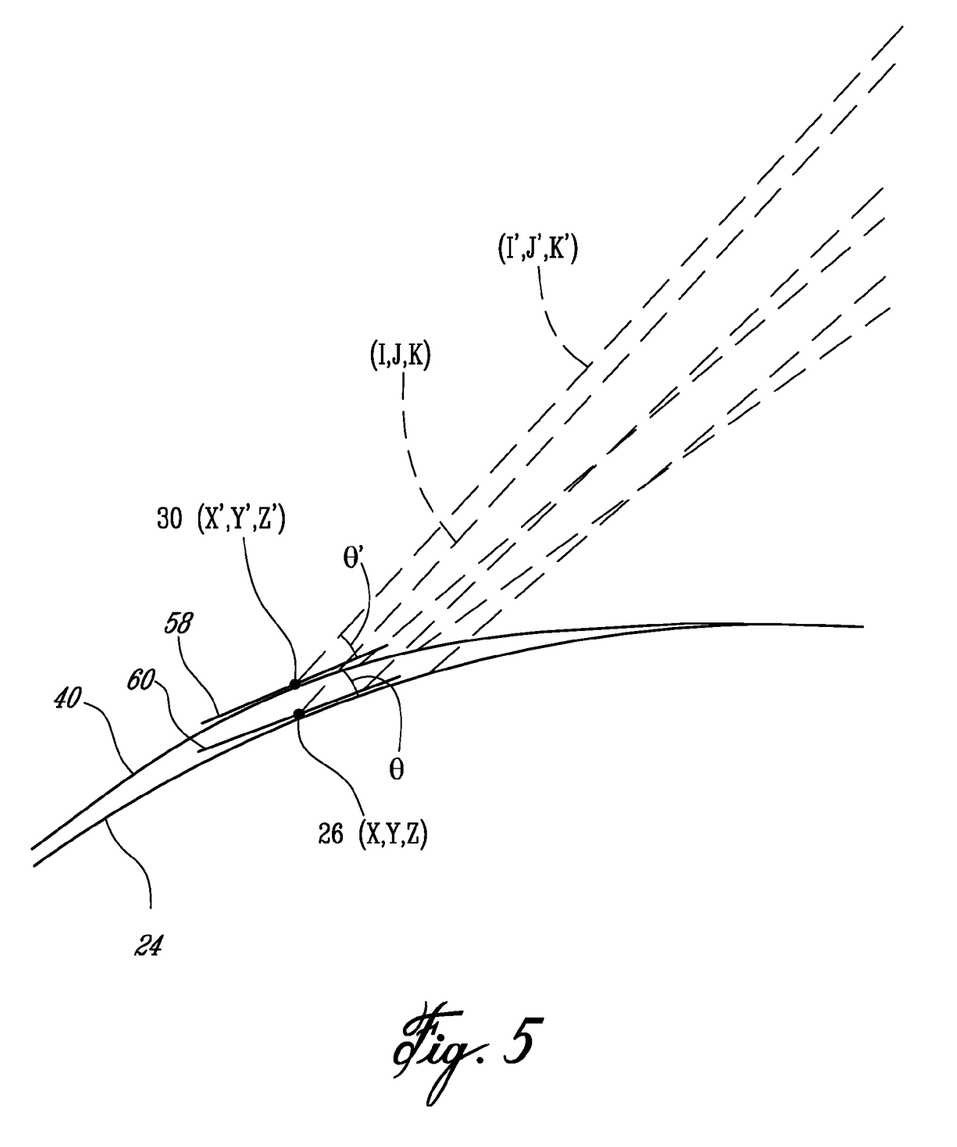
FIG. 5 is a schematic representation of a nominal profile and an actual profile of a part, illustrating a function of a comparator of the system of FIG. 2.

The calculator 56 determines the actual orientation 32 of each machined element based on the nominal orientation 28 and on a difference in orientation between the digitized actual surface 40 and the nominal surface 24 around each element. In a particular embodiment, and referring to FIG. 5, the calculator 56 receives the nominal orientation 28 of each machined element in the form of a nominal vector (I, J, K) defining the orientation of the machining tool for machining the element (e.g. the orientation of the axis of the hole). The calculator 56 then defines an actual plane 58 tangential to the digitized actual surface 40 around the actual location 30 of the element, a nominal plane 60 tangential to the nominal surface 24 around the nominal location 24 of the element, and a rotation necessary to bring the nominal plane 60 parallel to the actual plane 58. The calculator 56 applies that rotation to the nominal vector (I, J, K), and projects the rotated nominal vector onto a plane extending through a central axis of the part and the actual location 30 of the element (represented by the plane of the sheet in FIG. 5) to obtain a compensated vector (I', J', K'). As such, the angle θ' defined between the compensated vector (I', J', K') and the digitized actual surface is similar to the angle θ defined between the nominal vector (I, J, K) and the nominal surface, such as to obtain an actual orientation of the machine geometrical element (e.g. orientation of a drilled hole with respect to the surface of the part) as close as possible to the corresponding nominal orientation while ensuring that the machining process is performed with the machining tool oriented toward a center of the part.

In a case where the calculator 56 uses a projection parallel to an adjacent reference surface to determine the actual location (X', Y', Z') of the elements, the orientation is also compensated with respect to that adjacent surface such that the actual orientation of each element maintains a nominal angle with respect to the actual reference surface.

In an alternate embodiment, such as for example when machining cooling holes in a heat shield or in a blade, it is not necessary for the machining process to be performed with the machining tool oriented toward a center of the part, and as such the compensated vector (I', J', K') generated by the calculator 56 directly corresponds to the rotated nominal vector.

Referring back to FIG. 2, the compensation calculator 54 optionally includes a smoothing module 62, which receives the compensated vectors (I', J', K') from the calculator 56. The smoothing module 62 examines each compensated vector (I', J', K') in sequence, in the order the corresponding elements will be machined, and transforms each compensated vector (I', J', K') into a smoothed vector (I", J", K"). In a particular embodiment, the smoothed vector (I", J", K") of each element corresponds to the average of a group composed of compensated vectors (I', J', K') of a given number of elements to be machined before and after that element. In a particular embodiment, the given number is selected between 3 and 10 inclusively. Alternate methods of determining the smoothed vectors (I", J", K") include computing the smoothed vectors (I", J", K") from a same row such that each extends at a same angle to the digitized actual surface than an average angle of the compensated vectors (I', J', K') of that row, or computing the smoothed vectors (I", J", K") such as to have a same rotation between each smoothed vector (I", J", K") and the corresponding compensated vector (I', J', K') as in a reference row of elements. The smoothed vectors (I", J", K") are returned to the calculator 56, and the calculator 56 outputs the actual orientation 32 of each element in the form of an actual vector which corresponds to the respective smoothed vector (I", J", K").

In an alternate embodiment where the smoothing module 62 is omitted, each actual vector representing the actual orientation 32 of the respective element corresponds to the respective compensated vector (I', J', K').

In an alternate embodiment, to minimize the computing time, the calculator 56 determines the compensated vector (I', J', K') as described above for only selected ones of the machined elements, which are preferably regularly spaced apart with a number n of machined elements located in between. The compensated vectors (I', J', K') of each group of n machined elements are set such as to produce a progressive transition between the respective angle θ' defined by the compensated vectors (I', J', K') of the selected machined elements delimiting the group. In this case the compensated vectors (I', J', K') are thus naturally smoothed and the smoothing module 62 is omitted, the actual orientation 32 of each element corresponding to the respective compensated vector (I', J', K').

The smoothing module 62 and the method described above where the compensated vectors of groups of n machined elements are selected such as to produce a progressive transition between selected machined elements delimiting each group are particularly useful in the case of fast machining operations such as drilling-on-the-fly, minimizing the changes of orientation of the machining tool between the machining of adjacent elements such as to minimize the risk of premature wear of the machining tool components.

When the actual location 30 and the actual orientation 32 of each element is determined, the elements are provided (e.g. machined) on the actual part, as illustrated by step 110 of FIG. 3. Alternately, each element can be machined as soon as its actual location and orientation are determined, e.g. as the actual location and orientation of other elements is being determined.

In a particular embodiment, the connected fixture 42 and part 48 are removed from the scanner 38 and installed in the machine tool 34, with a position of the fixture 42 within the machine tool 34 being known, such as to machine the part 48. Alternately, the scanner 38 and machine tool 34 can be provided in a same machine, such that the part 48 and fixture 42 are not moved between the scanning and machining operations.

In a particular embodiment, the scanner 38, which can be for example the scanner 38 shown in FIG. 4, is optionally used to capture the real part after being machined as illustrated by step 112 of FIG. 3, through the determination of a final digitized actual surface 64, for example a point cloud corresponding to a plurality of points on the surface of the machined part, representing the actual surface with the machined elements. The comparator 50 then compares the final digitized actual surface 64 with the nominal part (e.g. from the CAD program 22) to evaluate, through a best fit between the two, an accuracy of the machining operation and/or whether further machining is required, as illustrated by step 114 of FIG. 3. The final digitized actual surface 64 or digitized part can also be recorded as a digitized model for future analysis. The final digitized actual surface 64 preferably has a higher definition than the digitized actual surface 40 used for the determination of the actual location 30 and the actual orientation 32 of the elements to be machined, in order to be able to accurately capture the small machined elements in the machined part. For example, the scanner 38 can provide of a point cloud of more than a hundred million points, of which only a given number (e.g. 200) of the closest points around each hole are kept to define the final digitized actual surface 64 for analysis to reduce the necessary analysis time and complexity.

As the system modifies the nominal orientation and position of each individual geometrical element to correspond to the actual part, the nominal model is thus "compensated" for each geometrical element to be machined in each actual part. Prior art systems usually try to determine an overall position of the actual part such as to apply a same offset to all geometrical elements. By comparison, the present system thus allows increased accuracy in the position and orientation of each actual geometrical element machined into the actual part, such that the differences between the actual parts and between each actual part and the nominal part are minimized.

Figure 6:
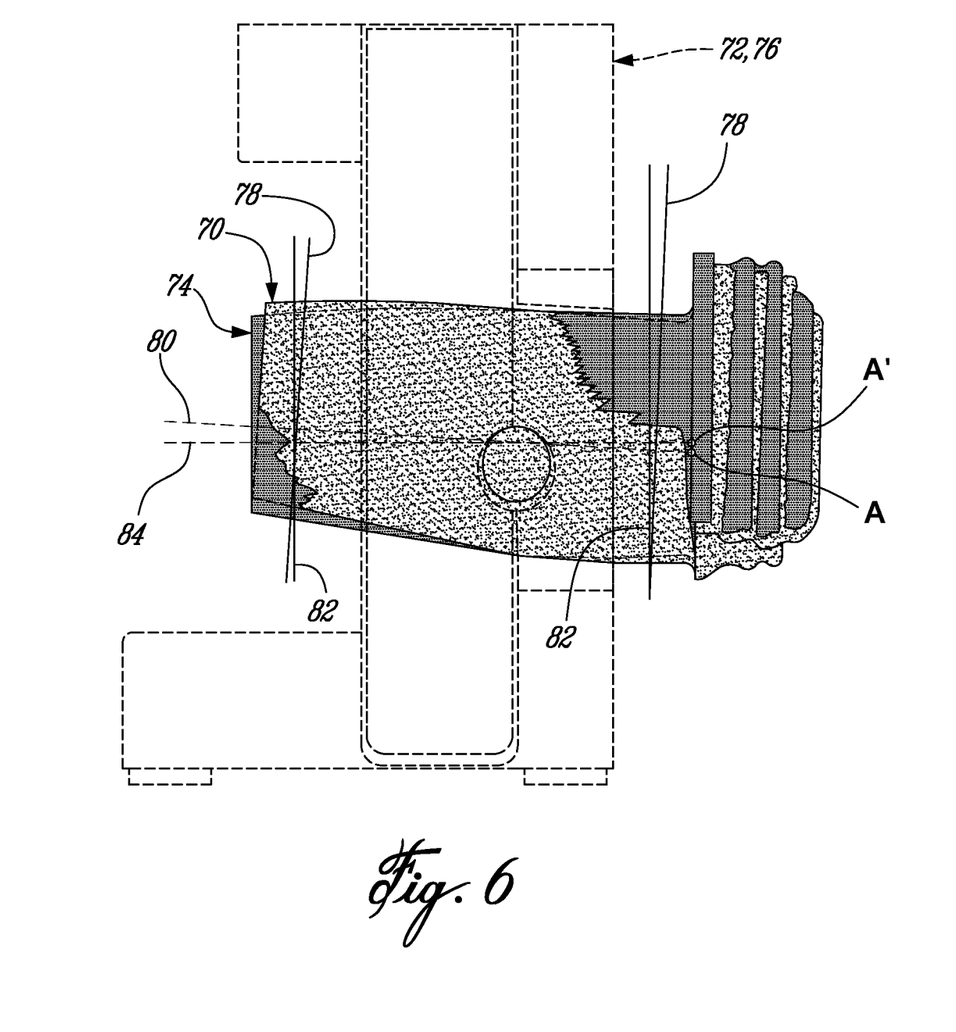
FIG. 6 is a side view of a blade and encapsulation assembly, showing an alternate application of the system of FIG. 2.
Figure 7:
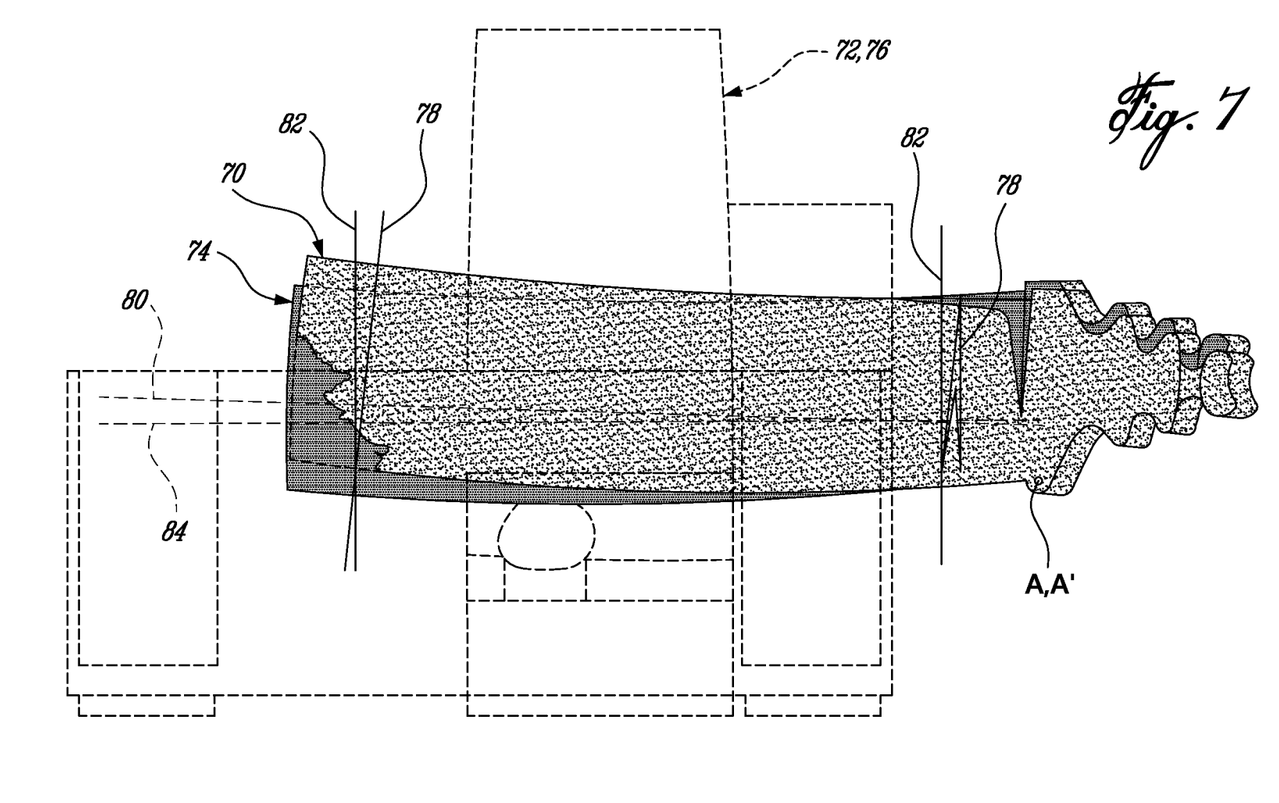
FIG. 7 is a front view of the blade and encapsulation assembly of FIG. 7.

FIGS. 6-7 illustrate an alternate application of the system and method described above, namely the machining of rotor blades. An actual blade 70 is contained in an actual encapsulation 72, formed for example of melting zinc alloy injected around the blade 70, which is used as a holding module during the machining process.

In the prior art, the location of the blade with respect to its encapsulation is generally inspected, for example with a coordinate measuring machine (CCM), and the encapsulated blade is sent to machining only if the location of the blade in the encapsulation is within a given tolerance zone. If the location of the blade is not acceptable, i.e. outside the tolerance zone, then the encapsulation is removed, a new encapsulation is created, and the encapsulated blade is re-inspected. This method has the disadvantages of requiring substantial training of the operators performing the encapsulation, reducing the available tolerance for the machining process by allotting a portion of the manufacturing tolerance to a tolerance zone for the location of the blade in the encapsulation, as well as increasing time and cost of the manufacturing process each time an encapsulated blade is rejected and the encapsulation process needs to be redone.

By contrast, the present system, for example as shown in FIG. 2, allows machining of the blade regardless of its position within the encapsulation. The nominal surface 24 received by the comparator 50 define both the nominal encapsulation 76 and the nominal blade 74, and the digitized actual surface 40 provided by the scanner 38 to the comparator 50 includes the digitized actual surface of both the actual encapsulation 72 and the actual blade 70 in which at least one geometrical element is to be machined (e.g. fir tree base, notch, etc.). The comparator 50 performs a tridimensional comparison between the digitized actual surface 40 and the nominal surface 24 to find a correlation or best fit between the digitized actual encapsulation and the nominal encapsulation, without regard to the location of the actual and nominal blades 70, 74.

The calculator 56 determines reference elements on the digitized actual surface 40, for example actual extreme sections 78 (uppermost and lowermost of several reference sections defined on the blade), an actual stacking line passing 80 through the X and Y zero location of each actual extreme section 78, and a reference point A common on the casting and on the machined blade. This is preferably done through an iterative process such as to increase the precision of the position of the actual reference elements. The calculator 56 receives the nominal location 26 and nominal orientation 28 of similar reference elements on the nominal surface of the blade (e.g. nominal extreme sections 82, nominal stacking line 84 and nominal point A') and, aligning the digitized actual encapsulation with the nominal encapsulation following the best fit found by the comparator 50, determines the deviation, including translation and rotation, between the reference elements on the digitized actual surface and the corresponding reference elements on the actual surface. In a particular embodiment, an average deviation is computed and expressed by a translation $\Delta(X, Y, Z)$ and a rotation vector $\Delta(I, J, K)$. The translation and rotation $\Delta(X, Y, Z, I, J, K)$ is then applied as an offset to the nominal location 26 and the nominal orientation 28 of each geometrical element to be machined to obtain the corresponding actual location 30 and actual orientation 32 of these elements.

In a particular embodiment, the calculator 56 is separated in a first module determining the deviation and encoding the calculated values for $\Delta(X, Y, Z, I, J, K)$ in a matrix which is embedded on the capsule, and a second module which may be integrated in the machine tool and which includes a code reader reading the matrix, the second module applying the deviation $\Delta(X, Y, Z, I, J, K)$ as an offset to the nominal location and orientation 26, 28 of each geometrical element to be machined to obtain the corresponding actual location and orientation 30, 32 of these elements.

As such, the system advantageously allows the use of the complete part tolerance for the machining of the part. The necessity to evaluate the accuracy of the blade position within the encapsulation and potentially having to remove and reform the encapsulation as a result of that evaluation is eliminated, thus simplifying the machining process. As such the complexity of training required for the operator responsible for the encapsulation is advantageously decreased because of reduced accuracy requirements of that encapsulation. Each actual blade is individually compensated in relation to its location within its encapsulation, and the consistency between actual parts being machined is thus increased.

The system and method described herein thus allow the nominal tridimensional definition of a part to be adapted to each one of a series of actual parts that are manufactured, such as to substantially reduce the variation in the location and orientation of the machined geometrical elements. The location and orientation of each of the machined elements, which can be for example a thousand holes pierced through a single part, is adapted to the actual, real surface of the part such as to obtain a part as close as possible to the part defined in the nominal model. The quality of the parts produced is advantageously increased, and the repeatability of the machining process is increased as well, thus reducing waste parts.

In the case where the part is a gas turbine engine combustor lining and the machined elements are a plurality of holes drilled through the lining, this adaptation of the hole location and orientation to the actual profile ensures that the hole angle with respect to the surface of the lining is similar to the nominal angle for each of the holes, and that the hole distribution in the real lining is similar to the nominal hole distribution, thus in use providing a more consistent airflow within the combustor lining through the machined holes, and a better performance uniformity between similar combustor linings.

The system also substantially reduces required accuracy in the position of the actual part to be machined within the fixture retaining the part during the machining operation. Increased accuracy in the actual part position is usually required in the prior art methods in order to ensure a minimum of consistency between successive machined parts. By contrast, the present system compensates for the position difference between the nominal and the actual part in addition to compensating for the differences in the nominal and actual surfaces, through the tridimensional comparison between the nominal part and each actual part. As such, regardless of the position of each actual part within the fixture retaining it during the machining (and scanning) operations, the position and orientation of the machined elements are compensated such as to be as close as possible to the position and orientation required by the nominal model. Accordingly, the consistency between successive machined actual parts is increased, while the necessity for precision in the design of retaining fixtures and the training for operators responsible for placing the parts to be machined in those fixtures is substantially reduced.

The above description is meant to be exemplary only, and one skilled in the art will recognize that changes may be made to the embodiments described without department from the scope of the invention disclosed. For example, in the present specification and claims, the terms "machining", "machined", etc. are used in a generic sense, and apply to manufacturing methods in which a part configuration or shape is changed by a tool: laser drilling, other drilling techniques as well as other material removing techniques whether by laser or with another adequate tool such as trepanning, cutting, boring, electrical discharge machining (EDM), lathing, grinding, milling, etc., operations such as bending or other forming operations, any suitable operation in which the shape or configuration of a part of workpiece is affected, or any other suitable operation. Modifications which fall within the scope of the present invention will be apparent to those skilled in the art, in light of a review of this disclosure, and such modifications are intended to fall within the appended claims.

What is claimed is:

1. A manufacturing method, the method comprising:
   providing a physical part
   establishing nominal tridimensional part definition of the physical part, the nominal tridimensional part definition including a nominal part surface, and a nominal location and orientation for at least one geometrical element of the physical part, the at least one geometrical element selected from a group consisting of; a surface, a profile, an ellipse, a diameter, an angle, a plane, a slot, a hole and a groove, the nominal tridimensional part definition further including digital elements corresponding to each of the at least one geometrical element;
   capturing an actual tridimensional surface of the physical part to obtain a corresponding digitized actual surface, the digitized actual surface including actual digital elements for each of the at least one geometrical element;
   performing a tridimensional comparison between the digitized actual surface and the nominal part surface, including determining a corresponding one of the actual digital elements of the digitized actual surface for each of the digital elements of the nominal tridimensional part definition, determining a relative displacement and rotation between the actual digital elements of the digitized actual surface and the digital elements of the nominal tridimensional part definition;
   generating an actual location and orientation of each of the at least one geometrical element on the digitized actual surface based on the tridimensional comparison; and
   providing each of the at least one geometrical element on the actual surface based on the actual location and orientation of the at least one element on the digitized actual surface.

2. The method according to claim 1, wherein capturing the actual tridimensional surface includes determining a plurality of points on the actual surface of the part, such that the digitized actual surface corresponds to a point cloud.

3. The method as defined in claim 1, wherein providing each geometrical element on the physical part includes drilling at least one hole.

4. The method according to claim 1, wherein the part is selected from the group consisting of a gas turbine combustor liner, a gas turbine combustor heat shield, a vane ring, a blade ring and an airfoil, and wherein providing each geometrical element on the physical part includes drilling a plurality of cooling holes.

5. The method according to claim 2, wherein capturing the actual tridimensional surface includes determining the plurality of points such that a distance between adjacent points is smaller than a size of a smallest one of the at least one geometrical element.

6. The method as defined in claim 1, wherein capturing the actual tridimensional surface includes scanning the part using one of a laser scanner, a tomography apparatus, a coordinates measuring machine and a photogrammetry apparatus.

7. The method as defined in claim 1, wherein generating the actual orientation of each of the elements includes defining an actual vector corresponding to an orientation of a machining tool when machining the element.

8. The method as defined in claim 7, wherein defining each actual vector includes performing a rotation of a nominal vector corresponding to the nominal orientation of the element on the nominal part surface to obtain the actual vector, the rotation corresponding to a necessary rotation to bring a nominal plane parallel to an actual plane, the nominal plane being tangential to the nominal part surface around the nominal location of the element and the actual plane being tangential to the actual digitized surface around the actual location of the element.

9. The method as defined in claim 8, wherein generating the actual orientation for each of the elements further includes performing the rotation of the nominal vector and projecting each actual vector in a corresponding plane extending through the actual location of the element and through a central axis of the part to obtain the actual orientation.

10. The method as defined in claim 7, further comprising smoothing the actual vector of each of the elements by changing the actual vector to correspond to an average of the actual vectors of a predetermined number of elements to be machined immediately before and immediately after the element.

11. The method as defined in claim 1, further comprising, after machining each of the elements, capturing an actual tridimensional surface of each machined part to obtain a corresponding final digitized actual surface, and comparing the final digitized actual surface of each machined part with the nominal part definition to evaluate an accuracy of the machining.

* * * * *